(12) United States Patent
Held et al.

(10) Patent No.: US 9,393,900 B2
(45) Date of Patent: Jul. 19, 2016

(54) LIGHT DEVICE AND METHOD OF ASSEMBLING A LIGHT DEVICE

(75) Inventors: Alfred Held, Oberschleissheim (DE); Heinz Kiermeier, Oberschleissheim (DE)

(73) Assignees: Alfred Held, Oberschleissheim (DE); Heinz Kiermeier, Oberschleissheim (DE)

( * ) Notice: Subject to any disclaimer, the term of this patent is extended or adjusted under 35 U.S.C. 154(b) by 521 days.

(21) Appl. No.: 13/256,169

(22) PCT Filed: Mar. 15, 2010

(86) PCT No.: PCT/EP2010/053314
§ 371 (c)(1),
(2), (4) Date: Dec. 22, 2011

(87) PCT Pub. No.: WO2010/103129
PCT Pub. Date: Sep. 16, 2010

(65) Prior Publication Data
US 2012/0092889 A1 Apr. 19, 2012

(30) Foreign Application Priority Data
Mar. 13, 2009 (EP) .................................... 09155163

(51) Int. Cl.
*F21V 7/04* (2006.01)
*B60Q 1/32* (2006.01)
*B60Q 1/26* (2006.01)

(52) U.S. Cl.
CPC *B60Q 1/323* (2013.01); *B60Q 1/26* (2013.01); *Y10T 29/49826* (2015.01)

(58) Field of Classification Search
CPC .. G02B 6/0035; G02B 6/0036; G02B 6/0038; G02B 6/0068; G02B 6/0073
USPC .................................. 362/606, 612–613, 618
See application file for complete search history.

(56) References Cited

U.S. PATENT DOCUMENTS 5,876,107 A * 3/1999 Parker et al. .................. 362/600
6,164,790 A * 12/2000 Lee ............................... 362/618
(Continued)

FOREIGN PATENT DOCUMENTS

EP 2 028 048 A1 2/2009

OTHER PUBLICATIONS

European Search Report dated Aug. 10, 2009 issued in corresponding European Application No. 09155163.0.
(Continued)

*Primary Examiner* — Robert May
*Assistant Examiner* — Bryon T Gyllstrom
(74) *Attorney, Agent, or Firm* — Finnegan, Henderson, Farabow, Garrett & Dunner, LLP

(57) ABSTRACT

Light device (1), comprising a light circuit (4) including at least one light emitting unit (6), a light diffusion panel (3), and a light housing (2) for mounting the light circuit (4) and light diffusion panel (3), wherein the thickness of the assembled light device (1) is approximately three millimeters or less, the length of the light device (1) and the length of the light diffusion panel (3) are at least approximately five times the width of the light device and the width of the light diffusion panel (3), respectively, and the light circuit (4) is arranged next to the light diffusion panel (3), the at least one light emitting unit (6) being arranged to emit light into at least one side edge of the light diffusion panel (3).

20 Claims, 10 Drawing Sheets

(56) References Cited

U.S. PATENT DOCUMENTS

| | | | |
|---|---|---|---|
| 6,296,372 B1* | 10/2001 | Rhomberg | 362/225 |
| 6,582,095 B1* | 6/2003 | Toyoda | 362/235 |
| 7,108,416 B1* | 9/2006 | Osawa | 362/618 |
| 2002/0131261 A1* | 9/2002 | Inui et al. | 362/31 |
| 2002/0140880 A1* | 10/2002 | Weindorf et al. | 349/70 |
| 2003/0002294 A1* | 1/2003 | Chiang | 362/545 |
| 2004/0196646 A1* | 10/2004 | Machi et al. | 362/31 |
| 2005/0213351 A1* | 9/2005 | Yang | 362/633 |
| 2006/0238664 A1* | 10/2006 | Uehara et al. | 349/1 |
| 2007/0201234 A1* | 8/2007 | Ottermann | 362/341 |
| 2007/0297191 A1* | 12/2007 | Sampsell | 362/602 |
| 2008/0170405 A1 | 7/2008 | Kamiya et al. | |
| 2008/0253140 A1 | 10/2008 | Fleischmann et al. | |
| 2008/0285307 A1* | 11/2008 | Aylward et al. | 362/618 |

OTHER PUBLICATIONS

International Search Report from the European Patent Office in International Application No. PCT/EP2010/053314 mailed May 27, 2010.

* cited by examiner

LIGHT DEVICE AND METHOD OF ASSEMBLING A LIGHT DEVICE

The invention concerns a light device, comprising a light circuit including at least one light emitting unit, a light diffusion panel, and a light housing arranged to receive the light circuit and light diffusion panel.

The invention also concerns a method of assembling a relatively flat and elongated light device.

It is known to use decorative lighting in vehicles. For example, door frames, in particular door steps, may be provided with integrated light devices that may emit light when opening a door. Such light devices are oftentimes provided with a print such that images and/or words are displayed. When the light device emits light, the printed image or word is visible, even in dark circumstances. To mount these light devices in door steps of vehicles such that they meet with the aesthetical and constructional demands of automotive industry, these light devices have to be relatively flat.

An example of such a light device is disclosed in the German utility model DE102006002216. This light device is relatively flat, and is meant to be mounted in vehicle door steps. The flatness seems to be achieved by mounting Surface Mounted Device (SMD) type light emitting units on a flexible and relatively flat conducting plate. A transparent light conducting basis plate having cut-through holes for the SMD light emitting units is mounted on top of the conducting plate. A further transparent cover plate is placed on top of the basis plate. Protruding, three dimensional sign or image forming elements are provided in or on the transparent cover plate.

A goal of the invention is to provide for an alternative, relatively flat and elongated light device that can be readily mounted on or in construction parts.

This goal and/or other goals may be achieved by a light device according to claim 1.

A light housing is provided for mounting a light circuit and a light diffusion panel. The light circuit may comprise a printed circuit and light emitting units. The light emitting units may emit light into the side edge of the light diffusion panel. In an embodiment, the light emitting units may comprise light emitting diodes (LED's). By mounting the light diffusion panel and the light circuit next to each other, stacking may be largely prevented, and the light device may remain relatively flat.

By this arrangement, the light device may be elongated and flat, in particular it may be less than three millimeters thick, more particularly less than or approximately equal to 2.5 millimeters. In an exemplary embodiment, the thickness of the light device is approximately 1.6 millimeters or less. The thickness of the light device may be measured between the bottom and the top surface of the housing, wherein the light circuit and the light diffusion panel, do not exceed above or below the housing. In an assembled condition, the light device may be essentially strip shaped.

Furthermore, the light device may be relatively elongated. For example the ratio between the width and length of the device may be at least 1:5, although even longer relative elongation may be achieved, having ratios such as 1:8, 1:10, 1:20 or higher. With a light device according to the invention, relatively elongated light device may be achieved. Preferably, the light diffusion panel itself is relatively elongated, and the light circuit is arranged next to the light diffusion panel while taking up very little space, so that the dimensions of the light device may be substantially determined by the light diffusion panel. The light emitting units may be arranged at the sides of the light diffusion panel, to emit light into the side edges of the panel. The emitted light may be diffused and emitted over approximately the entire surface of the panel.

Preferably, the light device comprises a light strip to be mounted in or onto a construction part of a vehicle, preferably in a vehicle frame for a door, window, or hood, or the like, more preferably in a vehicle doorstep. The light device may have a relatively small amount of parts so as to be assembled relatively easily. The light device may meet with the aesthetical demands for automotive decoration or other types of decorative lighting. The arrangement of the light device is such that stacking may be prevented. The light device may be arranged such that a decreased thickness and a reduced complexity may be achieved with respect to existing light devices for similar purposes.

The relatively small thickness of the light device may allow the device to be mounted onto a standard construction part of a vehicle without necessarily needing to provide a cut out in the respective construction part for receiving the light device. However, the light device may also be mounted in a cut out of the respective construction part, or between construction parts, or may be connected in any other manner to the construction part.

The light housing may comprise a first, elongated, cut out for the light diffusion panel, and at least one second cut out for the light circuit, wherein the second cut out may be arranged next to the first cut out. At least the first cut out may comprise a reflective surface. Also the second cut out may comprise a reflective surface. Upstanding walls around the respective cut outs may also be provided with reflective surfaces. Hence, the light that is emitted and diffused may be reflected so that a substantial part of the emitted light may exit the diffusion panel.

The light housing may comprise upstanding walls next to the cut outs, wherein in assembled condition the top surface of the upstanding walls extends at approximately the same or a higher level as the top surface of the light diffusion panel and the light circuit. In this way the assembled parts may be prevented from protruding above the top surface of the housing and a relatively flat top surface may be achieved.

In an embodiment, the light device comprises a cover foil covering the top surface of the light device. The foil may smoothen and/or protect the top surface of the light device. In a further embodiment, the cover foil may be provided with a print that is arranged to extend over the surface of the light diffusion panel, wherein the light device having said cover foil with print has a relatively smooth top surface. The light device may display signs and/or images that are printed on the cover foil by printing on the foil protrusions may be prevented. The signs and/or images may be readily printed on the foil. By applying a printed foil, protruding signs may be prevented. Hence, the light device may remain flat while a relatively large amount of freedom in the design of the signs and images may be achieved.

The light emitting units may comprise LED's, or preferably miniature sized light emitting units. The LED's may also comprise organic LED's. In an embodiment, the light emitting units may be arranged at one or both of the short edges of the light diffusion panel, to emit light into the respective short edge of the light diffusion panel. This may allow for a relatively small width of the assembled light device, as well as a reduction of complexity and necessary circuitry.

In an embodiment, the light diffusion panel may be provided with a raster for optimizing the diffusion of light emitted into the panel. The raster may be printed onto the top surface of the light diffusion panel and/or onto the cover foil.

In a further embodiment, a door frame, a window frame, or a hood frame may be provided, the frame being a construction part of a vehicle. In this description, the frame may be understood as the framework that surrounds the respective opening, for example the opening of the door, window or hood. The light device may be mounted into or onto such a frame. Preferably the frame may comprise a vehicle doorstep, wherein the light device may be mounted in or onto said frame.

Above mentioned goals and/or other goals may also be achieved by a method according to claim 16.

The light emitting units and the light diffusion panel may be assembled next to each other in the light housing. The assembled light device may for example be mounted in or onto a vehicle frame, preferably a vehicle door step.

In exemplary embodiments, the light housing may be injection moulded and/or may comprise a strip wherein the cut outs for receiving the light circuit and light diffusion panel are milled. Preferably, the edges of the light diffusion panel are formed or finished using a laser.

According to a further aspect of the invention, there is provided a thin light device according to claim 14. Design constraints may restrict or determine the size and type of the panel, and the number and arrangement of the light emitting units. But those constraints notwithstanding, a uniform emission of light across a predetermined portion of the surface may nonetheless be achieved by patterning the light diffusion panel in a manner which compensates for those design constraints. Thus, it will be appreciated that a light device that is designed having the light diffusion panel according to this aspect of the invention affords a high degree of design flexibility.

Exemplary embodiments of the invention are herein described with reference to the accompanying drawings, in which:

FIG. 1 schematically shows an exploded view in perspective of a first light device;

FIG. 2A and FIG. 2B schematically show a side view and top view, respectively of the light housing shown in FIG. 1;

FIG. 3 shows a top view of the light diffusion panel shown in FIG. 1;

FIG. 4 schematically shows a top view of the light circuit shown in FIG. 1, including electrically cables for powering the circuit;

Figure 8:
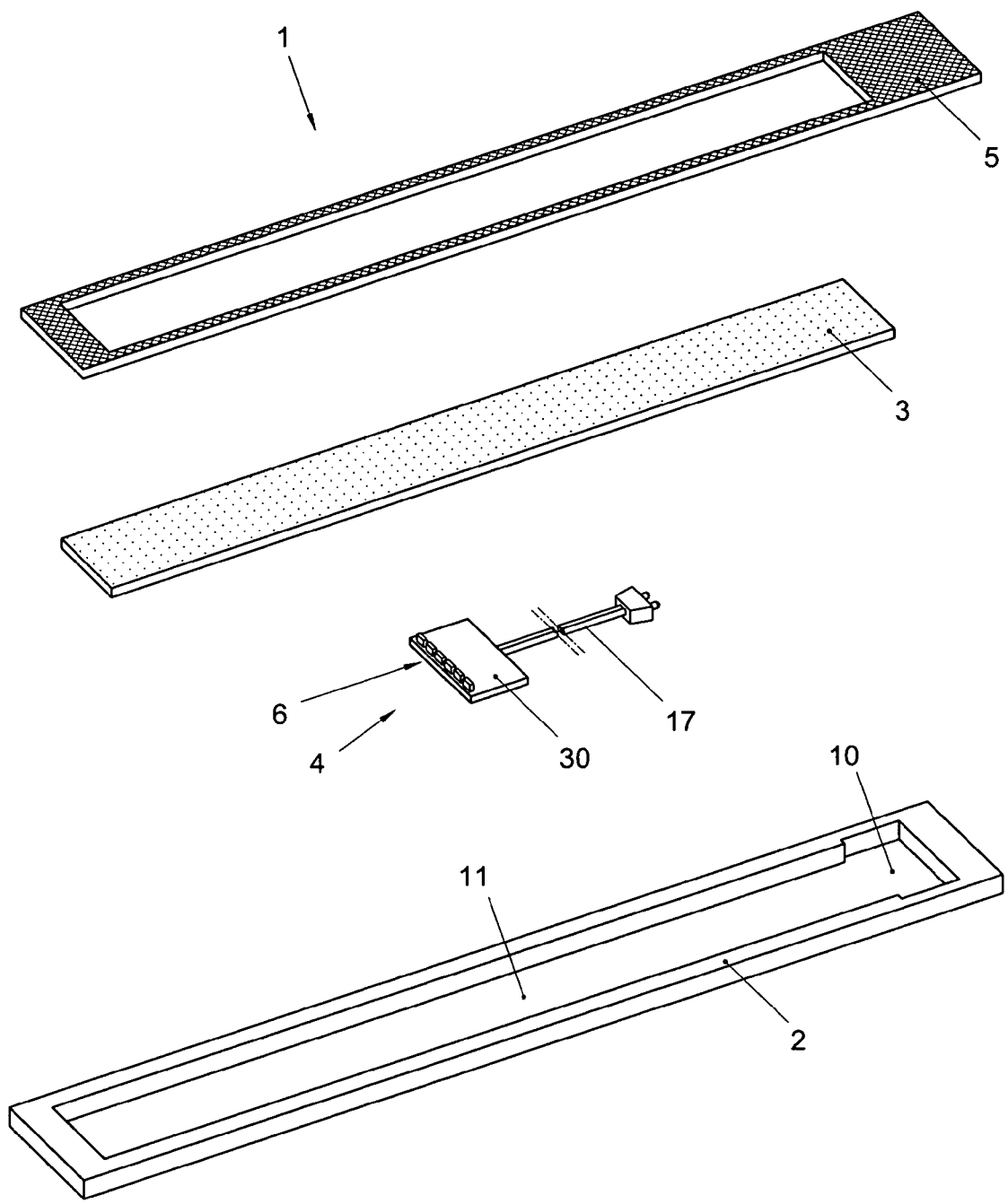
Figure 9:
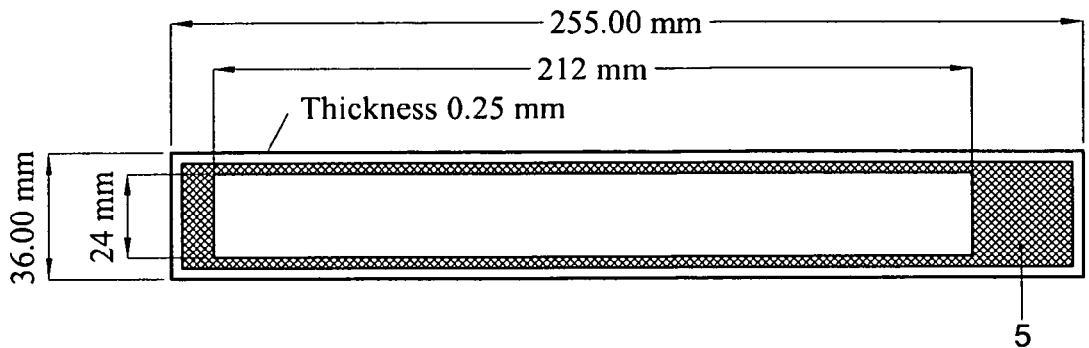
Figure 10A:
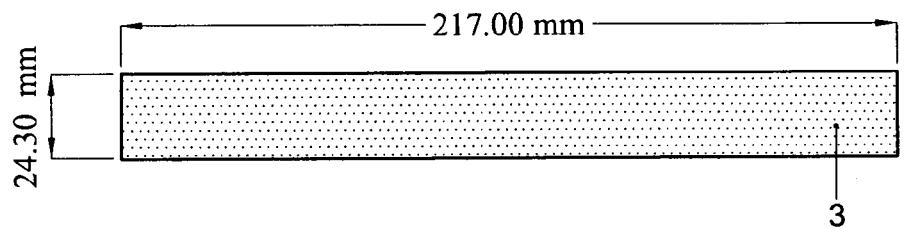
Figure 10B:
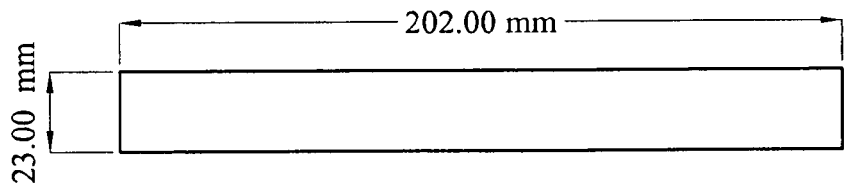
Figure 11:
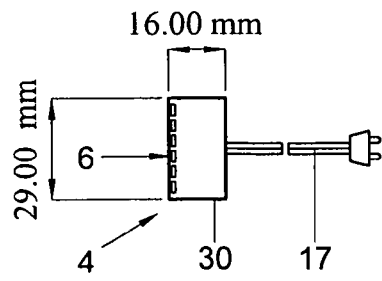
Figure 12:
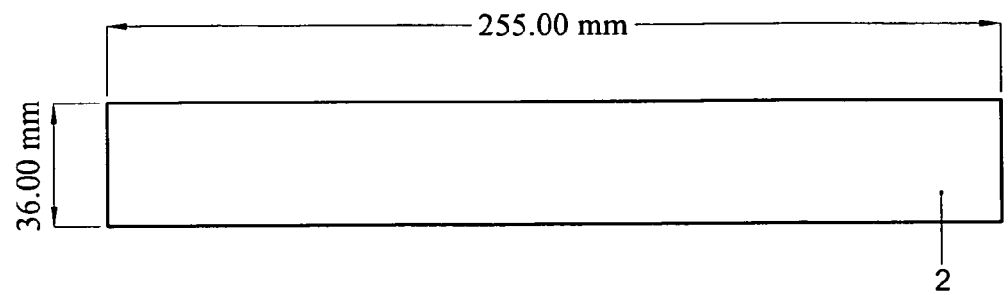
Figure 13:
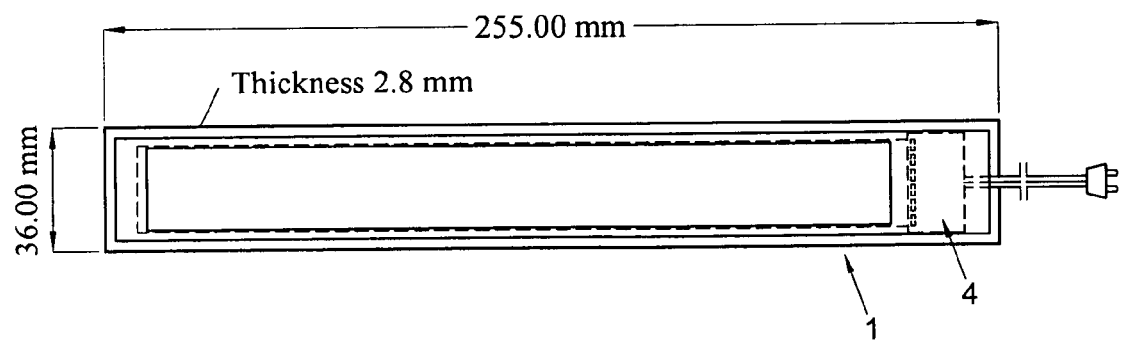
Figure 14:
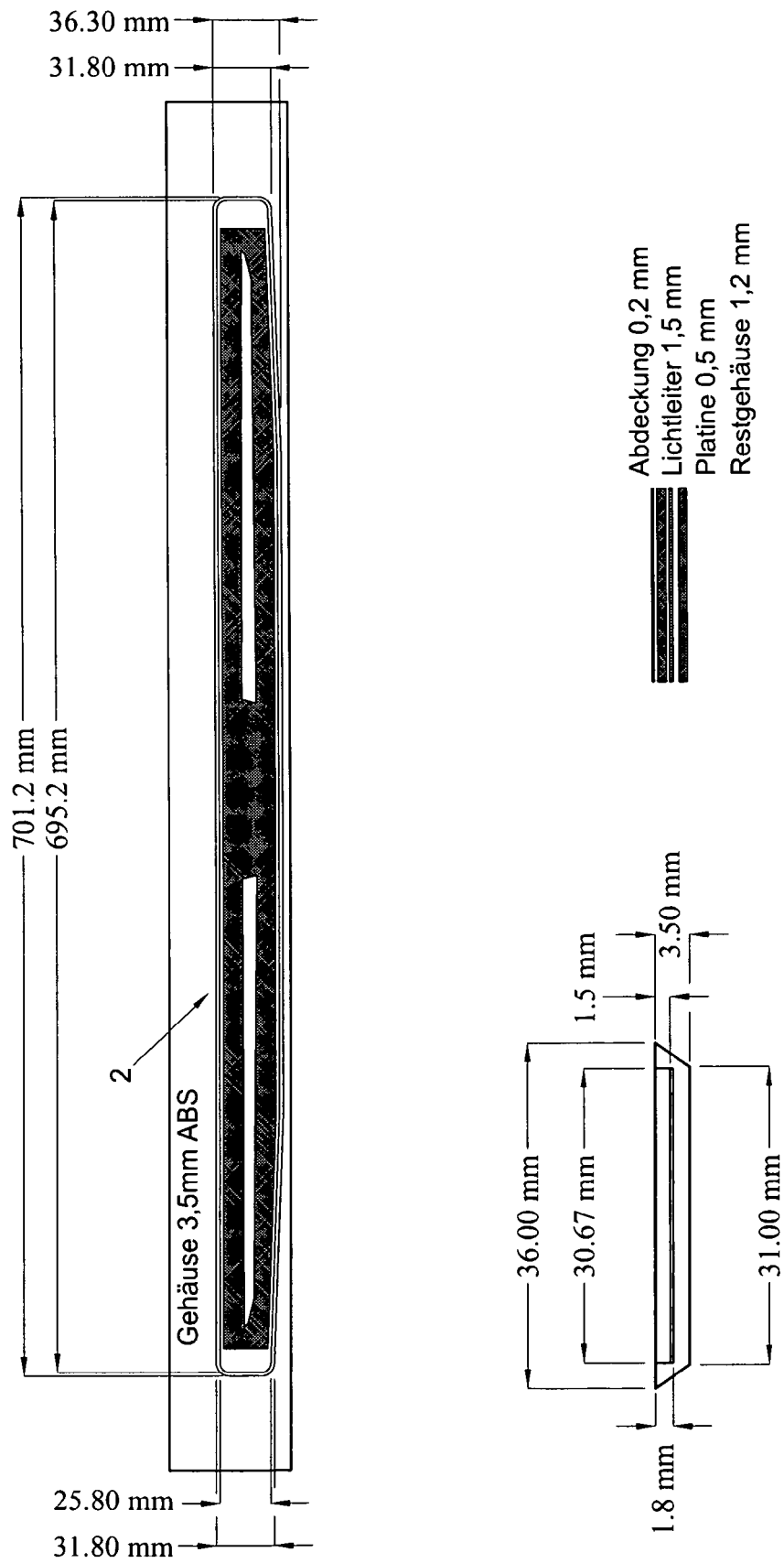
Figure 15:
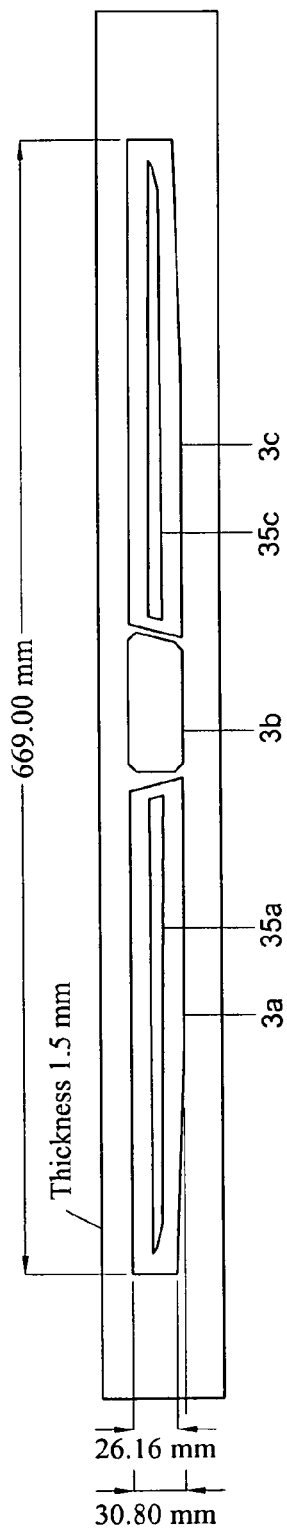
Figure 16:
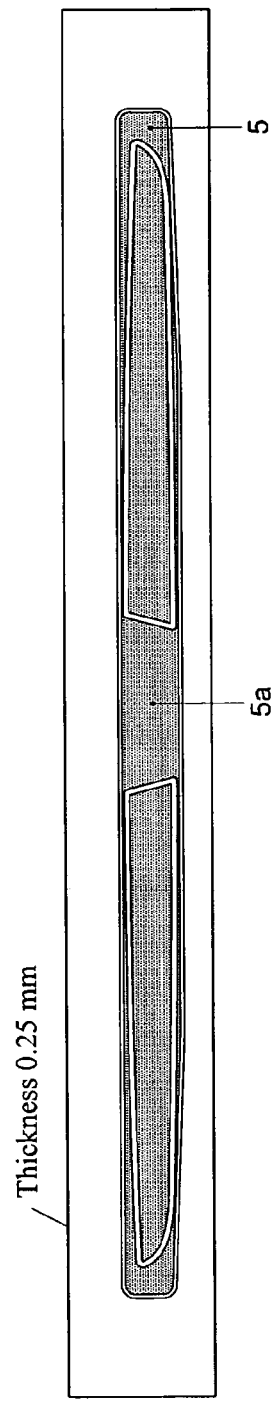
Figure 17:
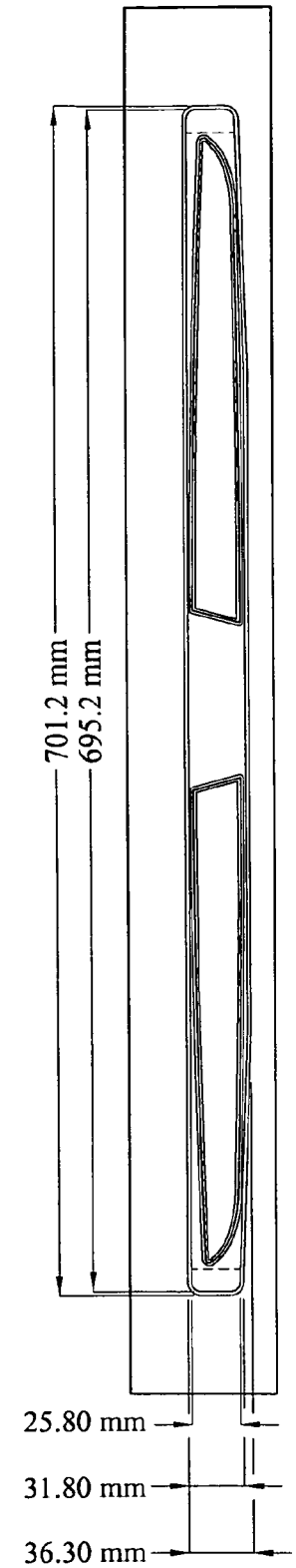

FIG. 8 schematically shows an exploded view in perspective of a second light device;

FIG. 9 shows the cover foil of FIG. 8;

FIG. 10A schematically shows the light diffusion panel of FIG. 8 and FIG. 10B shows the logo formed on the light diffusion panel;

FIG. 11 schematically shows a top view of the light circuit shown in FIG. 8;

FIG. 12 illustrates the outer dimensions of the light housing shown in FIG. 8;

FIG. 13 shows a top view of the second light device of FIG. 8 when assembled;

FIG. 14 shows a schematic view of a light housing of a third light device;

FIG. 15 shows a schematic view of the light diffusion panels of a third light device;

FIG. 16 shows a foil cover of a third light device;

FIG. 17 shows a top view of the third light device; and

Figure 18:
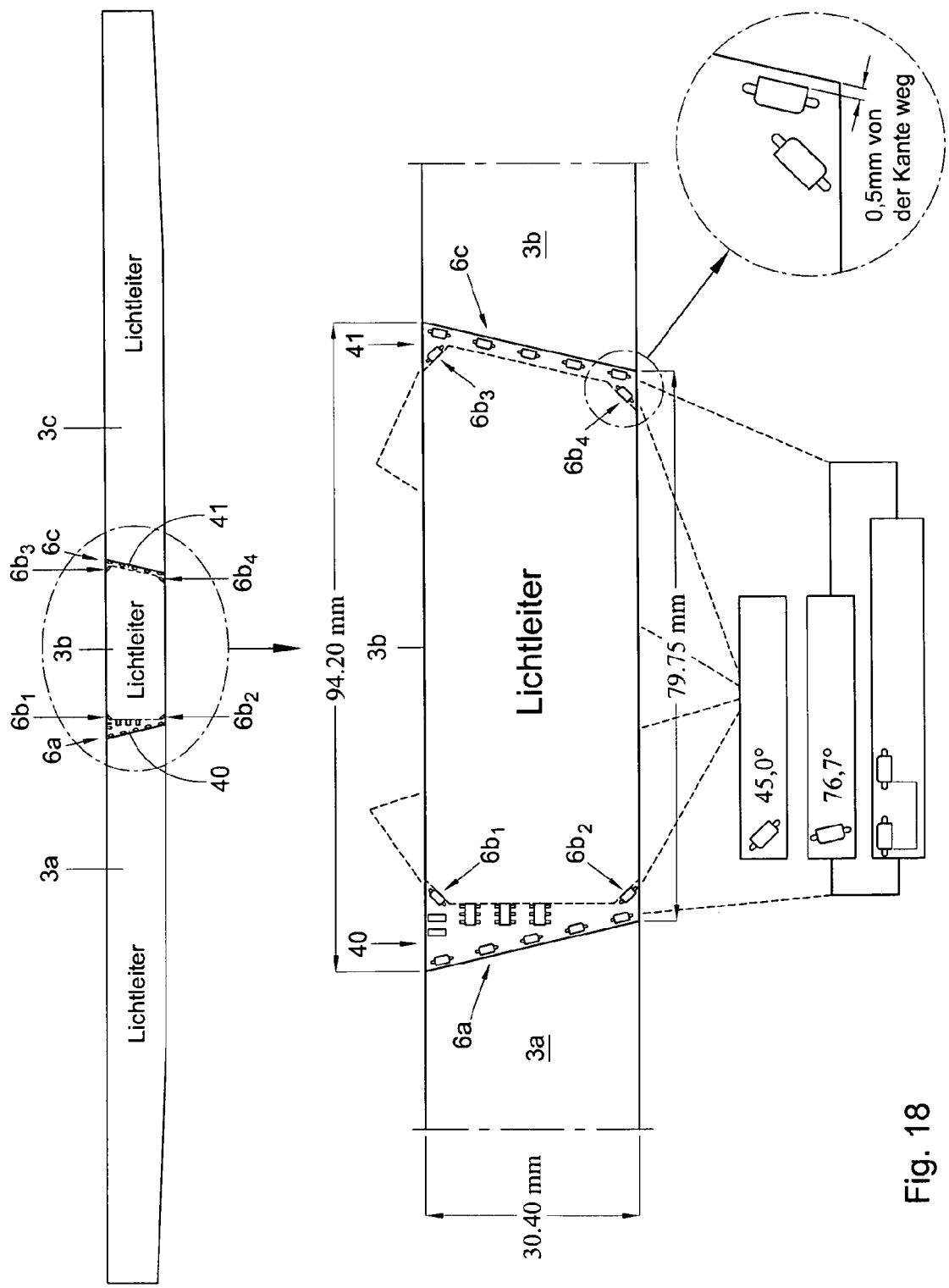

FIG. 18 shows a schematic representation of the layout of the various light circuits with respect to the light diffusion panels of FIG. 15.

In this description, where identical or corresponding parts exist, identical or corresponding reference numerals have been used. The exemplary embodiments shown should not be construed to be limiting on the scope of the invention in any manner and serve merely as illustration.

Figure 1:
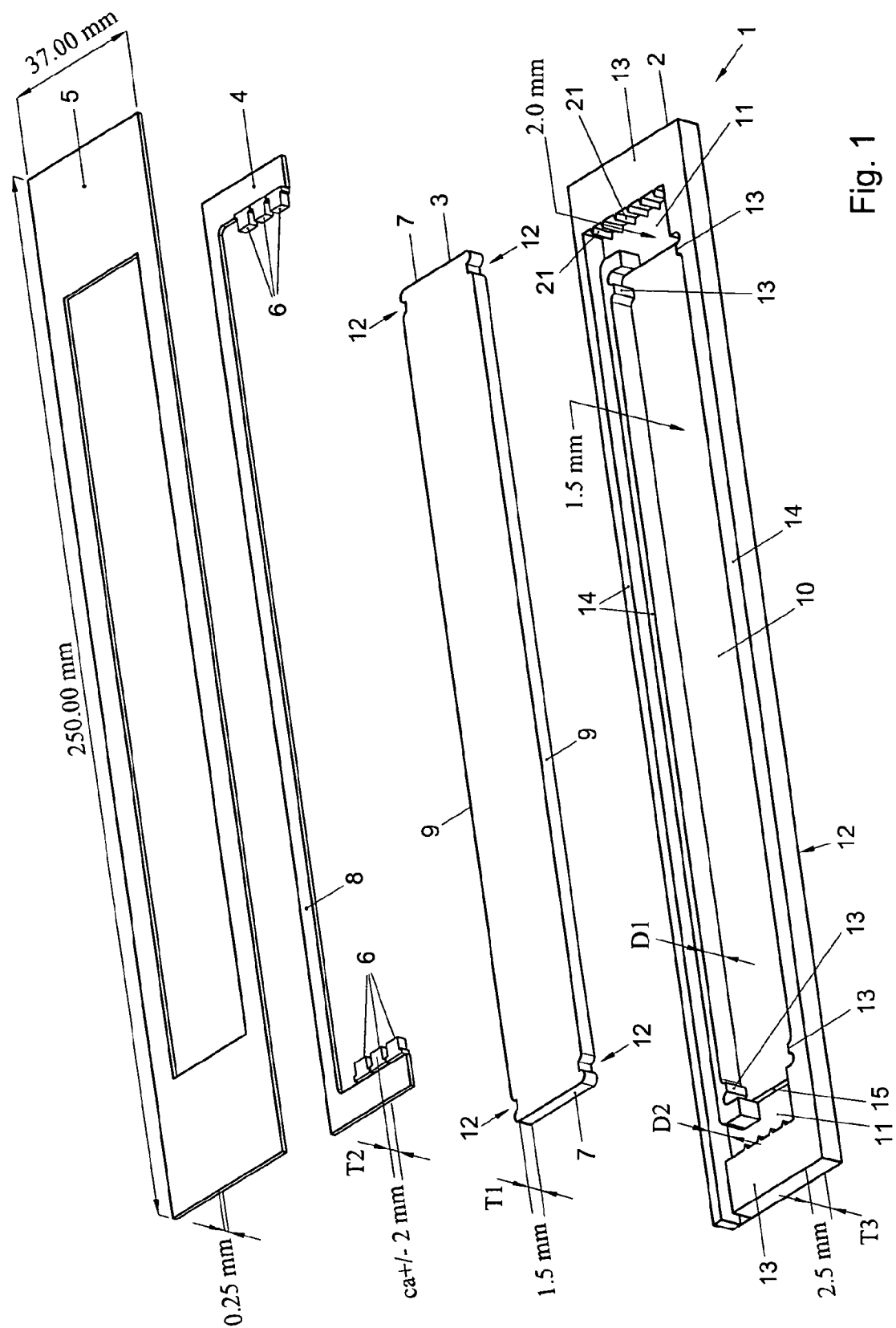

FIG. 1 shows an exploded view of parts that are to be assembled to form a first light device 1. In particular, a light housing 2, a light diffusion panel 3, a light circuit 4, and a cover foil 5 are shown, together forming the first light device 1.

The light circuit 4 comprises a printed circuit provided with LED's 6 (with lenses). The LED's 6 are arranged at the short edges 7 of the light diffusion panel 3, for example three LED's 6 at each short edge 7. An electrical conductor 8 is connected to the LED's 6, and is arranged alongside a long edge 9 of the light diffusion panel 3. The light circuit 4 is arranged next to the light diffusion panel 3.

Figure 2A:
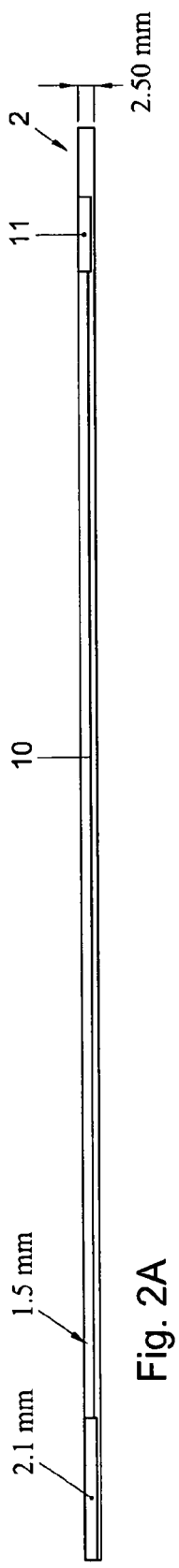
Figure 2B:
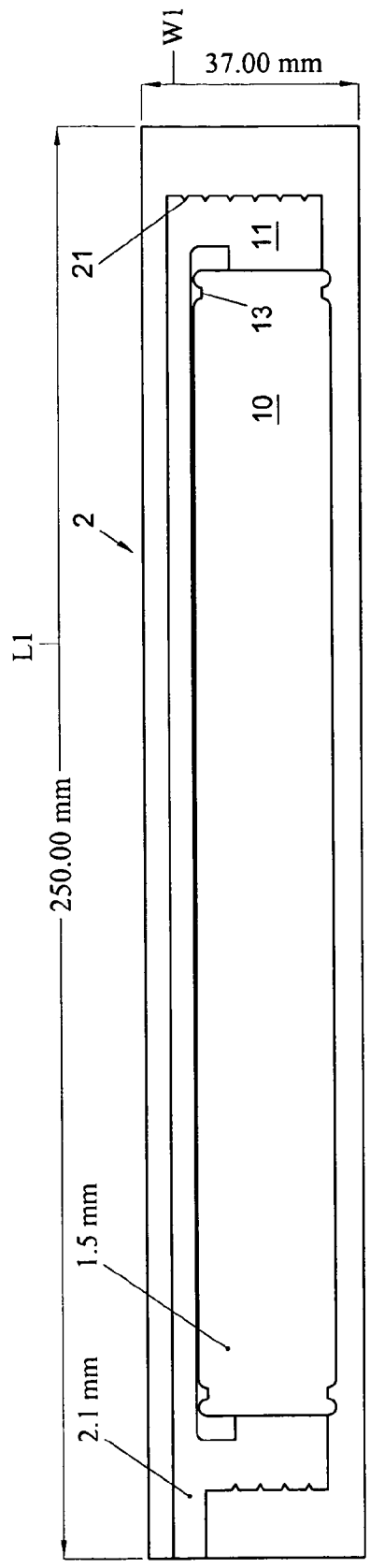

As shown in FIGS. 1, 2A and 2B, the light housing 2 has a first cut out 10 having an elongated shape, the dimensions of which correspond with the dimensions of the light diffusing panel 3. The thickness T1 of the light diffusion panel 3 is approximately 1.5 millimeters. Likewise, the depth D1 of the first cut out 10 is approximately 1.5 millimeters. In other embodiments, the thickness T1 of the light diffusion panel 3 and the depth D1 of the first cut out 10 may be less than 1.5 millimeters, for example, 1 millimeter or less.

Seen from above, the contour of the diffusion panel 3 and the first cut out 10 correspond so that the light diffusion panel 3 may be snugly received into the first cut out 10. The light diffusion panel 3 has side indentations 12 near the ends of the long side edges 9. The first cut out 10 has corresponding protrusions 13 that provide for a proper fitting of the light diffusion panel 3 in the first cut out 10, and prevent sliding of the light diffusion panel 3 within the housing 2.

The light housing 2 has a second cut out 11 for mounting the light circuit 8. The maximum thickness T2 of the light circuit 8 is determined by the thickness LED's 6. In the shown embodiment, this maximum thickness T2 is 2 millimeters, and further, the second cut outs 11 have a depth D2 of 2 millimeters. In other embodiments, the thickness T2 of the light circuit 4 and the depth D2 of the second cut out may be less than 2 millimeters, for example, 1.5 millimeters or less, or 1 millimeter or less. Preferably, miniature LED's 6 or other miniature light emitting devices with limited thicknesses, having light emitting properties adapted for its purpose are employed.

The second cut out 11 guides the conductors 8. Upstanding walls 14 of the housing 2 next to the second cut out 11 serve as protection for the conductors 8. The second cut out 11 directly borders the first cut out 10 at the short sided ends of the second cut out 11, so that the LED's 6 may directly emit light into the respective side edges 7 of the light diffusion panel 3. A small step 15 is present at the transition/border between the first and second cut out 10, 11. The contour of the second cut out 11 comprises protrusions 21 pointing inwards from the side wall 14 for accommodating and/or positioning the LED's 6 and/or connection elements for connecting the LED's 6 to the conductors 8.

In the shown embodiment, the thickness T3 of the light housing 2, between the top and bottom surface 12, is approximately 2.5 millimeters. The smallest thickness, for example, between the bottom surface of the second cut out 11 and the bottom 12 of the housing 2, is approximately 0.5 millimeters. In further embodiments, the thickness T3 of the housing 2 may be less than 2.5 millimeters, for example 1.6 millimeters or less. In other embodiments, the thickness T3 may be larger, for example approximately 3 millimeters or less.

As shown in FIGS. 1, 2A and B, the length L1 of the housing 2 is, for example, approximately 250 millimeters, while the width W1 is approximately 37 millimeters. According to embodiments of the invention, the length L1 of the housing 2 may be at least five times the width W1 of the housing 2, in particular at least seven times the width W1, more particularly at least ten times the width W1. The length L1 of the housing 2 may be even larger with respect to the width W1. The relative length may be adapted as to suit the application, for example a vehicle door step.

The housing 2 comprises substantially insulating material, such as a plastic, for example acrylonitrile butadiene styrene (ABS), for example of the type magnum 3453. The material of the housing preferably comprises non-transparent material so that emitted light does not exit through the housing 2. At the bottom and/or side walls of the cut outs 10, 11 reflective material is preferably provided for reflecting the light that is emitted by the LED's.

According to a preferred construction, the housing 2 may comprise a plate. The plate may be made by any suitable process, such as moulding or extrusion, for example, injection moulding. The cut outs 10, 11 are milled into the plate, for example, after moulding. For two cut out depths D1, D2, two milling actions are employed. In another embodiment, the housing 2 including the cut outs 10, 11 may be integrally moulded, for example injection moulded.

Figure 3:
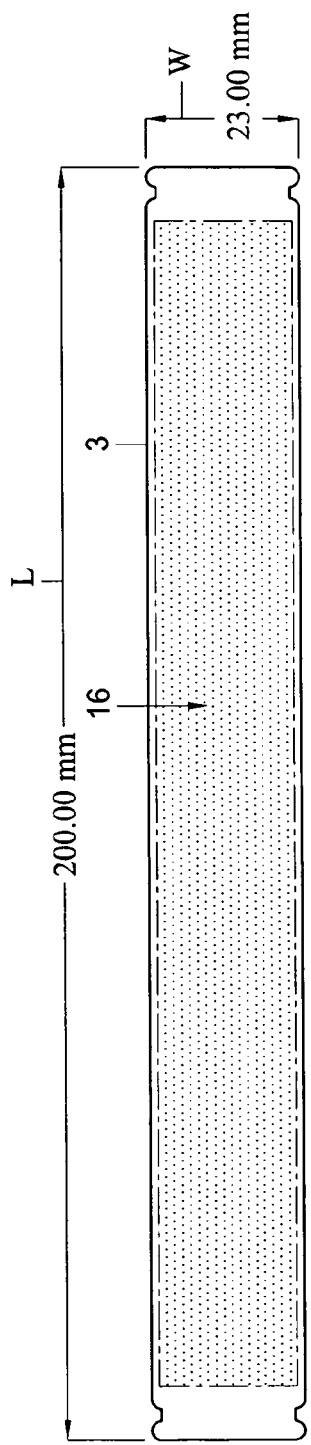

The light diffusion panel 3 is shown in FIGS. 1 and 3. The light diffusion panel 3 may comprise an elongated substantially massive plate. The panel 3 is made of light conducting material, such as Plexiglass or Perspex or the like, for example plexiglass of the type superclear 99560, which is a German industry standard.

In FIG. 3, the length L of the light diffusion panel 3 is approximately 200 millimeters, and the width W of the light diffusion panel 3 is approximately 23 millimeters. The panel 3 has an elongated shape. According to embodiments of the invention, the length of the panel 3 may be at least five times, at least eight times, or at least ten times or more larger than the width, or any other suitable length may be chosen. The length L of the light diffusion panel 3, may be adapted to the application.

For enhanced light diffusion, the panel 3 is preferably provided with a raster 16. The raster 16 may comprises a print that is printed on the panel 3. The print is provided on one side of the panel 3, in particular the light exiting side of the panel 3. The raster 16 may, for example, comprise alternating dots, squares and/or lines, or an inverse printing of alternating dots, squares and/or lines, as shown in FIG. 3. The raster 16 is arranged to locally alter the transparency so that the light exiting the panel 3 is diffused. The print may be of any suitable colour, for example, of the type that is known as UVPO weiss/60 HD, which is a German industry standard. A substantial part of the surface of the panel 3 may be provided with the raster 16.

Figure 4:
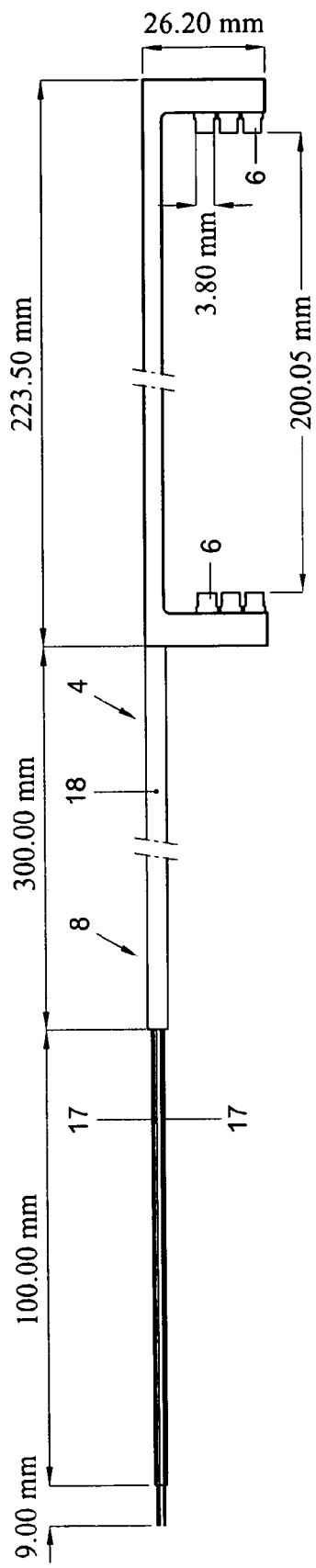
Figure 5:
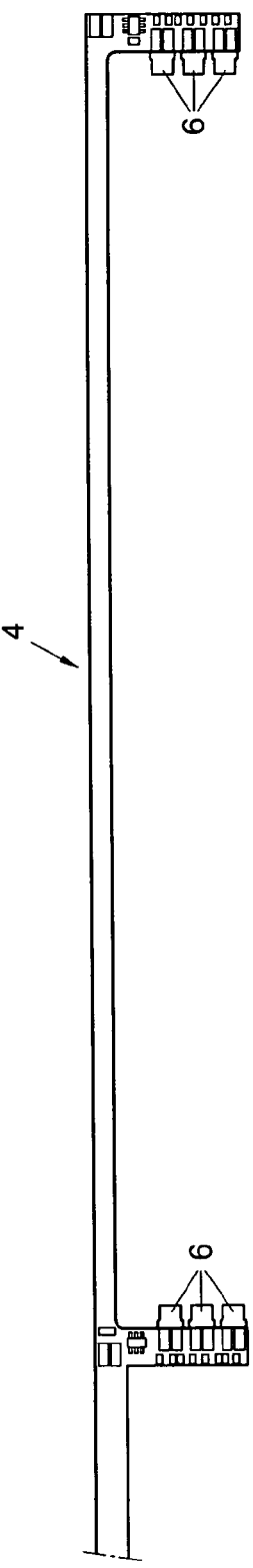
FIG. 5 shows a top view of the light circuit of FIG. 4, based on a picture of a prototype of the circuit.

FIGS. 4 and 5 show top views of the light circuit 4. The conductor 8 comprises at least two isolated, preferably relatively flat cables 17. The two cables are protected by an insulating flat band 18. The conductor 8 is arranged at least partly outside of the housing 2 to connect to an outside power circuit and/or control circuit (not shown). Connections to the LED's and/or between conductors 8 may be made by any suitable method, for example, by soldering. The LED's 6 are positioned at the outer ends of the housing 2 so that the light diffusion panel 3 fits between the opposite LED's 6, preferably only leaving a narrow space between the LED's 6 and the panel 3, for example, a space of 1 millimeter or less, such as 0.05 millimeters.

Figure 6:
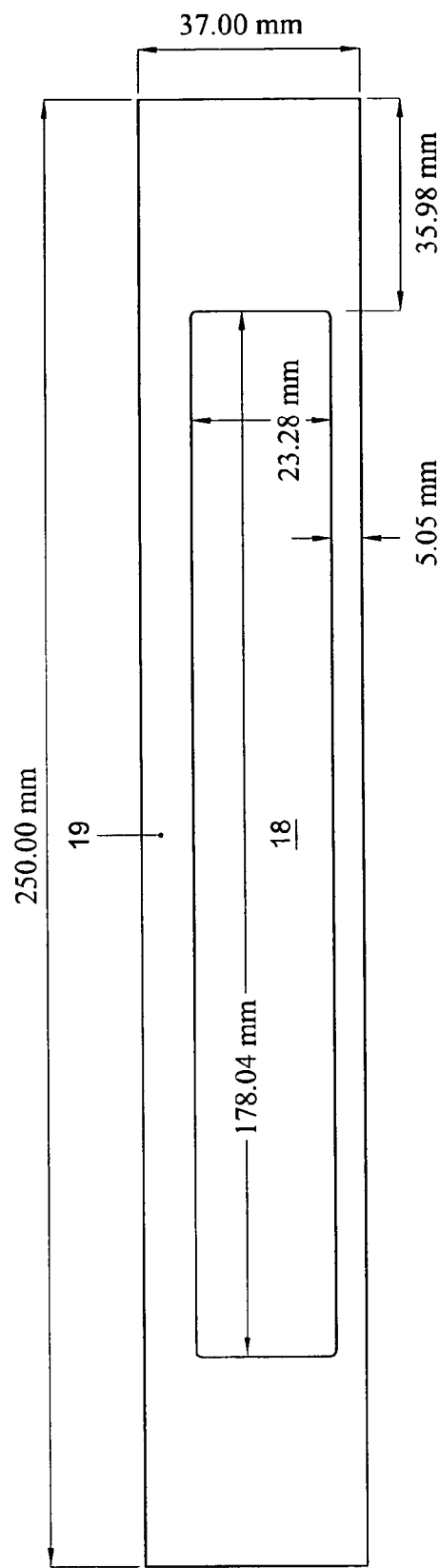
FIG. 6 shows the cover foil of FIG. 1.

FIG. 6 shows a cover foil 5 for covering the housing 2 with the light circuit 4 and the light diffusion panel 3. The outer surface dimensions of the cover foil 5 are approximately the same as the outer dimensions of the top surface of the housing 2, so that the cover foil 5 substantially covers the entire top surface of the housing 2. The foil 5 comprises a transparent part 18, which covers the light diffusion panel 3, and a non-transparent part 19, for covering the light circuit 4 and/or the top surface of the upstanding walls 14 of the housing 2.

The material of the cover foil 5 may be plexiglass, for example of the type Plexiglass XT weiss matt 250 my 99547M, which is a German industry standard. The top side of the foil 5 is relatively shiny. The transparent part 18 comprises a print having signs and/or images. The signs and/or images may for example comprise a letter, image, word, logo, photo, advertising, or the like. The print may be in black and/or white, or any colour and may have gradients. The print may locally prevent or change the output of light so that the print can be distinguished, at least when the light device emits light. For example, for the print the following colours may be used that are standardized in German industry. A certain white known as Marastar SR 170 Deckweiss Sieb may be used. A certain black known as Marastar SR 273 Deckschwarz Sieb may be used.

In an embodiment, the transparent part 18 of the foil 5 may comprise a raster, for example instead of, or in addition to, the raster 16 of light diffusion panel 3. The raster may be of the type known in German industry as Drucklack UV 70/488. In another embodiment, the transparent part 18 may comprise a cut through.

Figure 7:
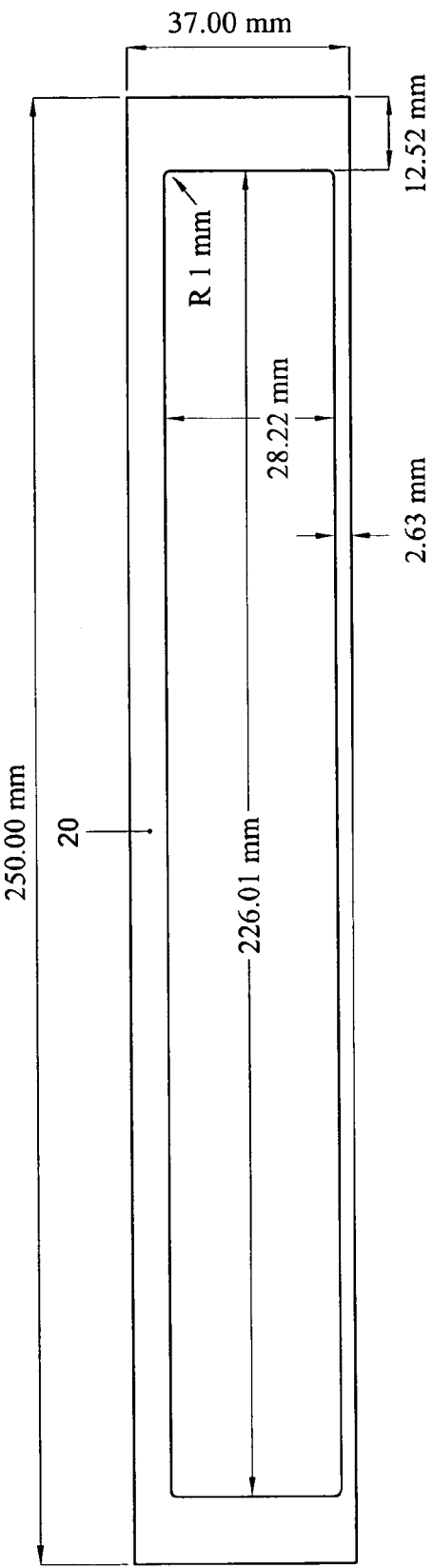
FIG. 7 shows an adhering foil for adhering the cover foil of FIG. 6 on top of the first light device.

The cover foil 5 is adhered to the housing 2, in particular the upstanding walls 14 thereof, and/or the panel 3, by adhering means, such as an adhering foil 20 (FIG. 7). The adhering foil 20 comprises a foil that adheres on both sides so that the cover foil 5 may adhere to the housing 2. The adhering foil 20 is arranged around the light diffusion panel 3. The adhering foil may be of the type Kleber 3M® Scotch® F9469, which may be known as a German industry standard. In another embodiment, the cover foil 5 may for example be glued to the housing 2.

FIGS. 8 to 13 show a second light device 1. The constructional details and possible variations to those details presented in relation to the first light device apply mutatis mutandis to the second light device, the second light device differing only in the respects shown in the drawings or explicitly mentioned below.

Referring to FIG. 8, the first cut out 10 and the second cut out 11 extend down to the same depth within the housing 2, i.e. the step 15 has been eliminated. The light circuit 4 comprises a thin substrate/circuit board 30 having a thickness of 0.1 millimeter on which is mounted a line of LED's 6 (without lenses). The LED's 6 have an individual height of 1.2 millimeter resulting in the light circuit 4 having an overall height of 1.3 millimeter. The light diffusion panel 3 has a height of 1.5 millimeter. When the second light device 1 is assembled, the light circuit 4 is located within the first cut out 10, the light diffusion panel 3 located within the second cut out 11 and the cover foil or member 5 closes the housing 2 as shown in FIG. 13. The power supply cable 17 passes through a channel (not shown) formed in a wall of the housing.

Since the nominal height/thickness of the light diffusion panel is 1.5 millimeter and that of the light circuit 4 is 1.3 millimeter, a 0.2 millimeter environmental tolerance window is created. Such a tolerance window is beneficial when the second light device is used on a vehicle which may be required to operate in extreme climatic conditions.

Since the light diffusion panel 3 is edge-lit from only one edge, the raster 16 is patterned to make uniform the amount of light exiting the panel 3 per unit area across the whole surface of the panel 3. Broadly speaking, this requires making regions near to the light circuit end less transparent and regions remote from the light circuit end more transparent. As a result, the failure of a single LED 6 has much less negative impact on (the user's perception of) the uniformity of light emission from the second light device 1 than is the case when a single LED 6 fails in the first light device 1.

A further advantage of the second light device 1 over the first light device is that since the overall height/depth of the light circuit 4 is less than the light diffusion panel 3, the step 16 can be eliminated and hence the thickness of the housing 2 can be reduced, whereby the overall thickness of the second light device 1 can be as little as 2 millimeter.

It has been found that in order to avoid local patches of non-uniform light emission near even slight imperfections in the edges of the light diffusion panel, the edges should be created or finished by laser.

FIGS. 14 to 18 show a third light device 1. The third light device 1 is constructed in a generally similar manner to the first and second light devices from a light housing 2, a light diffusion panel 3, and a light circuit 4, and a cover foil 5. The constructional details and possible variations to those details presented in relation to the first or second light devices apply mutatis mutandis to the third light device, the third light device differing only in the respects shown in the drawings or explicitly mentioned below.

Referring to FIG. 14, the light housing 2 comprises cut out regions to receive light diffusion panels and light circuits as per the previous embodiments, but these are not distinguishable in the drawing. Referring to FIG. 15, the third light device 1 comprises three discrete light diffusion panels $3a$, $3b$, $3c$. The light diffusion panel $3a$ has an elongate aperture $35a$, extending along most of its length and extending completely through the depth of the panel. The light diffusion panel $3c$ has a similar aperture $35c$. Referring to FIG. 16, the cover foil 5 has a transparent region $5a$ corresponding to the image that it is to be displayed. First and second irregularly shaped substrates 40, 41, having a thickness of 0.5 millimeter, are mounted in the interstices shown in FIG. 15 between the panels $3a$, $3b$ and panels $3b$, $3c$, respectively. The substrates 40, 41 carry the light sources to illuminate the panels $3a$, $3b$, $3c$ as described below.

Referring to FIG. 18, the substrate 40 carries a line of LED's $6a$ oriented at 76, 7° to the longitudinal axis of the device 1 for injecting light into the panel $3a$. The substrate 40 and the LED's $6a$ comprise a first light circuit $4a$ for the panel $3a$. The substrate 41 carries a line of LED's $6c$ also oriented at 76, 7° to the longitudinal axis of the device 1 for injecting light into the panel $3c$. The substrate 41 and the LED's $6c$ comprise a third light circuit $4c$ for the panel $3c$. In addition, LED's $6b_1$, and $6b_2$ mounted on opposite sides of the substrate 40 and LED's $6b_3$ and $6b_4$ mounted on opposite sides of the substrate 41 inject light into the panel $4b$. All the LED's $6b_1$, $6b_2$, $6b_3$, $6b_4$ are oriented at 45° to the longitudinal axis of the device 1. The LED's $6b_1$, $6b_2$, $6b_3$, $6b_4$ and the substrates 40, 41 comprise a second light circuit 4 for the panel $3b$. In other embodiments (not shown), the LED's could be mounted at different angles. FIG. 17 shows a fully-assembled third device 11.

In common with the second light device 1, the panels $3a$-$c$ are provided with rasters tailored to the specific geometry of the device and the properties of the light sources/circuits to achieve the required uniformity of light distribution. In this instance, it will be appreciated that the design of the rasters takes into account the fact that the panels $3a$, $3c$ are not continuous members but include elongate apertures $35a$, $35c$. The elongate apertures $35a$, $35c$ are provided as there is no need for the diffusion panels to be present in those regions, those regions being obscured by non-transparent portions of the covering foil/member 5. It will be appreciated that the patterning on the light diffusion panel enables the LED's to make use of the small and irregularly shaped interstitial regions between the panels $3a$, $3b$ and $3b$, $3c$ while still achieving the required uniformity of light emission.

Advantageously, the light devices 1 may be mounted in or onto a doorstep of an automotive vehicle such as a car, truck, or busses. They may be mounted in or onto the middle consoles, window frames, door frames, hood frames, panels, foot mats, gas-pedals, or other construction parts of the vehicles. Other applications may include two or three wheeled motor vehicles, and/or airplanes, and/or public transport vehicles such as trains, metros, trams, etc. The light devices may also be provided in other applications, such as, for example, ambient lighting, furniture, doormats, door edges, frames in buildings, rooms, etc. The light devices may for example be used for decorative, advertising and/or informative purposes. In an embodiment, the housing 2 and/or the diffusion panel 3 may comprise relatively flexible material, so that a relatively flexible light device 1 may be achieved, that may be arranged on or into curved frames.

It shall be obvious that the invention is not limited in any way to the embodiments that are represented in the description and the drawings. Many variations and combinations are possible. Combinations of one or more aspects of the embodiments or combinations of different embodiments, and all comparable variations are possible, as the skilled person will recognise.

The invention claimed is:

1. A light device, comprising:
   a light circuit including at least one light emitting unit mounted against at least one side-edge surface of a printed circuit board, the at least one side-edge surface of the printed circuit board being the thinnest surface of the printed circuit board and orthogonal to a component-pad-side surface of the printed circuit board,
   a light diffusion panel, and
   a light housing arranged to receive the light circuit and light diffusion panel, wherein
   the thickness of the assembled light device is approximately three millimeters or less,
   the length of the light device and the length of the light diffusion panel are at least approximately five times the width of the light device and the width of the light diffusion panel, respectively, and
   the light circuit is arranged next to the light diffusion panel, and the at least one light emitting unit is arranged to emit light into at least one side edge of the light diffusion panel.

2. The light device according to claim 1, wherein the top surface of the light diffusion panel is higher than the top surface of the light circuit by at least 1 millimeter, that difference in height serving as an environmental tolerance window above the light circuit.

3. The light device according to claims 1 or 2, wherein the light device comprises a light strip to be mounted in or onto a construction part of a vehicle, preferably a frame for a door, window, or hood of a vehicle, and more preferably a vehicle doorstep.

4. The light device according to claim 1, wherein the thickness of the assembled light device is approximately 2.5 millimeters or less, preferably approximately 1.6 millimeters or less.

5. The light device according to claim 1, wherein the light housing comprises a first, elongated, cutout for the light diffusion panel, and at least one second cutout for the light circuit, and wherein the second cutout is arranged next to the first cutout.

6. The light device according to claim 5, wherein the light housing comprises upstanding walls next to the cutouts, and wherein in assembled condition the top surface of the upstanding walls extends at approximately the same or a higher level as the top surface of the light diffusion panel and/or the light circuit.

7. The light device according to claim 1, wherein the light device comprises a cover foil covering the top surface of the light device.

8. The light device according to claim 7, wherein the cover foil is provided with a print that is arranged to extend over the surface of the light diffusion panel, and wherein the light device having said cover foil with print preferably has a relatively smooth top surface.

9. The light device according claim 1, wherein the at least one light emitting unit comprises a light emitting diode.

10. The light device according to claim 1, wherein the at least one light emitting unit is arranged at a short edge of the light diffusion panel, to emit light into the short edge of the light diffusion panel.

11. The light device according to claim 1, wherein light emitting units are arranged at two short edges of the light diffusion panel.

12. The light device according to claim 1, wherein the light diffusion panel is provided with a raster patterned to achieve a uniform emission of light across a predetermined portion of the surface of the light diffusion panel.

13. The light device according to claim 12, wherein a single side edge of the panel is configured to transmit light directly from the light circuit.

14. A vehicle frame for a door, window, or hood, preferably a vehicle doorstep, comprising the light device according to claim 1, wherein the light device is mounted in said frame.

15. A method for assembling a relatively flat and elongated light device, comprising:

providing a light housing and a light diffusion panel, wherein each has a thickness of approximately three millimeters or less and a length that is at least approximately five times its width, assembling a light circuit by mounting a first light emitting unit against a first side-edge surface of a printed circuit board, and mounting a second light emitting unit against a second side-edge surface of the printed circuit board, wherein the first side-edge surface and the second side-edge surface of the printed circuit board are not coplanar, positioning the light circuit next to the light diffusion panel in the light housing, wherein the light diffusion panel has a length that is at least approximately five times its width, and wherein the total thickness of the assembled light device is equal to or less than approximately three millimeters.

16. The method according to claim 15, wherein the assembled light device is mounted in or onto a vehicle frame, preferably a vehicle door step.

17. The method according to claim 15 or 16, wherein the light housing is injection moulded.

18. The method according to claim 15, further comprising milling cutouts in the light housing for receiving the light circuit and the light diffusion panel before positioning the light circuit in the light housing.

19. The method according to claim 15, wherein each of the first and second side-edge surfaces of the printed circuit board are parallel.

20. The light device according to claim 1, wherein the at least one side-edge surface of a printed circuit board includes a first side-edge surface and a second side-edge surface, the light circuit further includes at least one light emitting unit mounted against each of the first and second side-edge surfaces of the printed circuit board, wherein the first side edge surface and the second side-edge surface of the printed circuit board are not coplanar.

* * * * *